May 30, 1939.  S. F. ODELL  2,160,557
TRANSFER MECHANISM
Filed Dec. 3, 1937  2 Sheets-Sheet 1

Inventor
Stanley F. Odell
By Church & Church
His Attorneys

May 30, 1939.  S. F. ODELL  2,160,557
TRANSFER MECHANISM
Filed Dec. 3, 1937  2 Sheets-Sheet 2
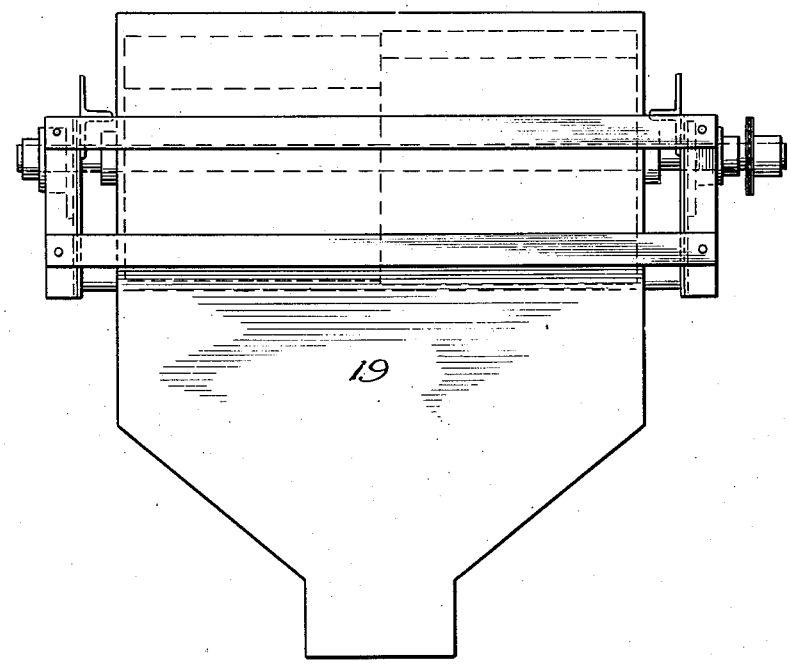
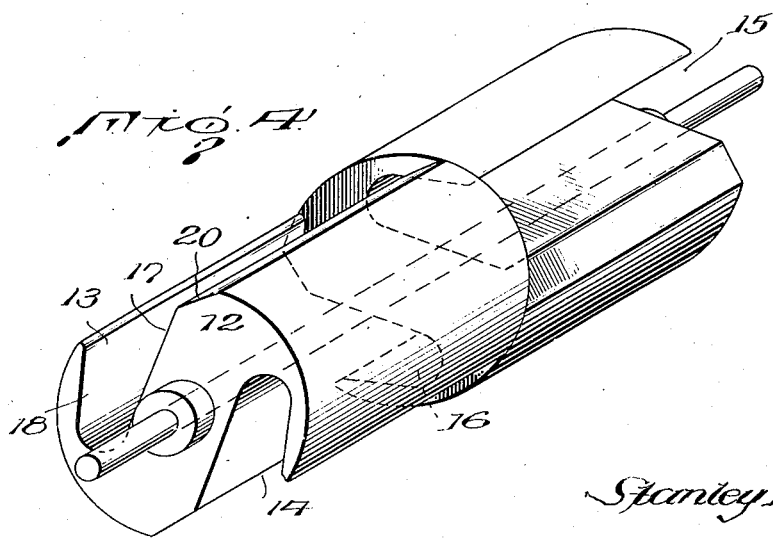
Inventor
Stanley F. Odell
By Church & Church
His Attorneys Patented May 30, 1939

2,160,557

UNITED STATES PATENT OFFICE 2,160,557

TRANSFER MECHANISM

Stanley F. Odell, Beacon, N. Y., assignor to Dutchess Tool Company, Beacon, N. Y., a corporation of New York Application December 3, 1937, Serial No. 177,995

1 Claim. (Cl. 198—25)

This invention relates to improvements in dough handling apparatus and, particularly, to a mechanism for transferring lumps of dough from one traveling conveyor to another such conveyor.

As is well understood, in the handling of dough in commercial bakeries, units or lumps of dough each representing the quantity of dough required for a loaf of bread are transferred from one form of dough-working apparatus to another, preparatory to baking. For instance, a mass of dough is passed through a divider which forms the individual lumps or units which are conveyed to a proofer and from the latter machine to a moulder or moulding machine. It is essential that the lumps be fed to the moulder singly or individually, and the primary object of the invention is to provide a transfer mechanism by which lumps of dough, traveling on conveyor means from the proofer, can be transferred to a second traveling conveyor and successively deposited on the latter in alinement, without danger or liability of the lumps doubling up, i. e., individual lumps will be deposited on the second conveyor in a regular, uniform, spaced relation lengthwise of the conveyor.

For increasing the efficiency of the several machines, the lumps are usually discharged from the proofer in a plurality of rows and a further object of the invention is to provide a transfer mechanism which will transfer lumps from a plurality of rows and deposit them on a second conveyor in uniform, spaced relation in a single row, regardless of the irregularity in the spacing of the lumps in the several rows delivered from the proofer to said transfer mechanism.

More specifically, the invention contemplates endless, traveling conveyor means for transporting plural rows of lumps from, say, the proofer; a second conveyor for delivering a single row of lumps to the rounder, and a transfer mechanism interposed between the two conveyor means, said mechanism comprising a rotating roll having recesses therein for receiving the lumps delivered from the proofer, the contour of the walls of said recesses and the relative rates of surface speeds of the conveyor means from the proofer and of the roll being such that only individual lumps will be deposited, even though two or more lumps accumulate, or are delivered more or less simultaneously, at the point of transfer from said conveyor to said roll.

With these and other objects in view, the invention consists in certain details of construction and combinations and arrangements of parts, all as will hereinafter be more fully described, and the novel features thereof particularly pointed out in the appended claim.

In the accompanying drawings:

Fig. 3 is an end elevational view; and

Fig. 4 is a perspective view of the transfer roll.

Figures 1, 2:
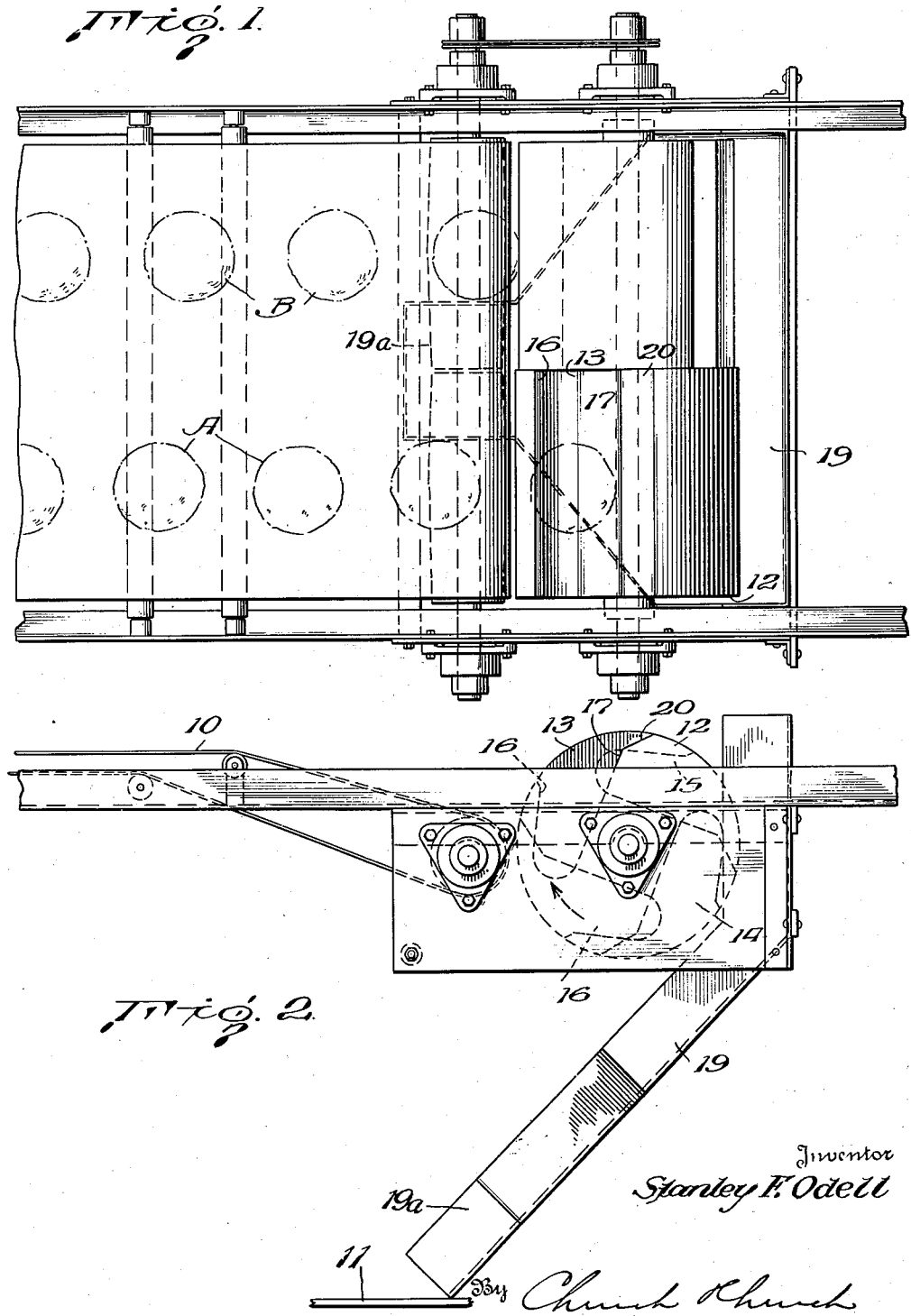
Figure 1 is a top plan view of the present transfer mechanism, the driving connections being omitted for purposes of clarity.
Fig. 2 is a side elevational view.

Assuming the transfer mechanism is interposed in the conveyor line between a proofer and a rounding-up machine, lumps of dough from the proofer are discharged onto an endless traveling belt 10, two rows, A and B, of said lumps, being indicated in the present instance. The endless traveling belt leading to the rounding-up machine, and to which said lumps are transferred, is indicated at 11, and both belts are adapted to be driven by connections (not shown) from any suitable source of power.

The spacing of the lumps in the respective rows A and B on the belt 10 is, oftentimes, quite irregular and it is essential that they be transmitted to and deposited in the rounding-up machine singly and with the utmost regularity. It is, therefore, necessary that lumps be transferred to belt 11 individually and deposited thereon in a single row. To accomplish this purpose, transfer roll 12, illustrated in Fig. 4, is interposed between the belts 10 and 11.

For apparatus handling two rows of lumps on the proofer belt 10, the transfer roll 12 is provided with four recesses 13, 14, 15 and 16, recesses 13, 14, being spaced 180° apart circumferentially of the roll in alinement with row A of lumps, and recesses 15, 16, similarly spaced apart circumferentially of the roll in alinement with row B of lumps. The two pairs of recesses are also staggered circumferentially of the roll, so that the recesses, considered as a group of four, are only 90° apart and lumps of dough will be received in the recesses alternately from the two rows A, B, every quarter revolution of the roll.

The transfer roll is driven by connections from a suitable source of power (not shown). As indicated in the drawings, the lumps in rows A and B may not be equidistantly spaced, or they may double up, so to speak, at roll 12 and, in order to prevent more than one lump entering a recess in the roll, each recess is of the peculiar formation illustrated. That is, each recess has an elongated or deep leading wall 17 and a similar following wall 18. The outer edge of leading wall 17 is beveled as at 20 and the following wall 18 extends a considerable distance forwardly from the bottom of the recess. Thus, the recess has sufficient capacity to carry one lump but, by providing the extended or elongated following wall 18 so that the same radially overlies a major portion of wall 17 and thus restricts the entrance to the recess, the speed of rotation of the roll causes the forward extremity of said following wall to intercept and prevent a second lump gaining access to its recess. In other words, the beveled forward edge of the leading wall 17 permits a lump of dough at the discharge end of belt 10 to fall or be partially deposited in the mouth of the recess and the forward extremity of the following wall 18, moving at the proper rate of speed relatively to the surface speed of belt 10, advances to intercept a second lump and prevent the latter entering that recess even though two lumps may be in contact with each other at the discharge end of said belt.

Continued rotation of the roll inverts the several recesses successively and causes the lumps carried therein to discharge by gravity to an inclined chute 19, the upper end of said chute being of a breadth substantially corresponding to the length of roll 10. The chute tapers downwardly and has its restricted discharge end 19a positioned immediately above the conveyor belt 11, so that the lumps of dough deposited in the upper end of the chute are delivered successively to the belt 11, and are deposited thereon in a single row at regularly spaced intervals. Hence, the lumps are delivered to the rounding-up machine at a uniform rate, regardless of how closely they might have been spaced on the discharge conveyor 10 of the proofer machine.

As will be apparent, the mounting for the conveyor belts, the transfer roll and of the chute 19 when the latter is used, may take various forms and a detailed description of the same is deemed unnecessary.

What I claim is:

A transfer roll for dough-handling apparatus having recesses in the periphery thereof each adapted to receive a single lump of dough, each recess having elongated leading and following side walls, the forward edge of the leading side wall of each recess being beveled and the following side wall of each recess extending forwardly circumferentially of the roll from the bottom of the recess to a point remote from said bottom.

STANLEY F. ODELL.